United States Patent
Alakuijala

(10) Patent No.: US 8,615,138 B2
(45) Date of Patent: Dec. 24, 2013

(54) IMAGE COMPRESSION USING SUB-RESOLUTION IMAGES

(75) Inventor: Jyrki Antero Alakuijala, Zurich (CH)

(73) Assignee: Google Inc., Mountain View, CA (US)

( * ) Notice: Subject to any disclaimer, the term of this patent is extended or adjusted under 35 U.S.C. 154(b) by 112 days.

(21) Appl. No.: 13/288,445

(22) Filed: Nov. 3, 2011

(65) Prior Publication Data
US 2013/0114893 A1    May 9, 2013

(51) Int. Cl.
G06K 9/36    (2006.01)
G06K 9/46    (2006.01)

(52) U.S. Cl.
USPC ............ 382/232; 382/166; 382/233; 382/238

(58) Field of Classification Search
USPC ................. 382/232–253; 375/240.01–240.29
See application file for complete search history.

(56) References Cited

U.S. PATENT DOCUMENTS

| | | | |
|---|---|---|---|
| 5,768,434 A * | 6/1998 | Ran ................................ | 382/240 |
| 5,805,735 A * | 9/1998 | Chen et al. ..................... | 382/239 |
| 6,853,755 B2 * | 2/2005 | Li .................................. | 382/239 |
| 6,947,592 B2 * | 9/2005 | Ishikawa ....................... | 382/166 |
| 2002/0097802 A1 * | 7/2002 | Lin et al. .................. | 375/240.23 |
| 2005/0078754 A1 | 4/2005 | Liang et al. | |
| 2005/0111741 A1 * | 5/2005 | Kim et al. ..................... | 382/232 |
| 2005/0249283 A1 * | 11/2005 | Kajiwara et al. ......... | 375/240.12 |
| 2007/0025631 A1 * | 2/2007 | Kim et al. ..................... | 382/248 |
| 2007/0223825 A1 | 9/2007 | Ye et al. | |
| 2007/0229325 A1 * | 10/2007 | Yokose et al. .................. | 341/51 |
| 2007/0255932 A1 | 11/2007 | Ono | |
| 2008/0043840 A1 * | 2/2008 | Song ........................ | 375/240.11 |
| 2009/0060356 A1 * | 3/2009 | Maynard et al. .............. | 382/232 |
| 2011/0080947 A1 * | 4/2011 | Chen et al. ............... | 375/240.12 |
| 2012/0099787 A1 * | 4/2012 | Song ............................. | 382/166 |

FOREIGN PATENT DOCUMENTS

| WO | WO 00/33583 A1 | 6/2000 |
|---|---|---|
| WO | WO 2008/008714 A1 | 1/2008 |

OTHER PUBLICATIONS

Masrabadi et al. "Image coding using vector quantization: A review", IEEE Trans. on Communications, 1988.*
Vaisey et al. "Image compression with variable block size segmentation", IEEE Trans. on Signal Processing, 1992.*
Portable Network Graphics (PNG) Specification (Second Edition), downloaded from http://www_w3.org/TR/PNG on Sep. 29, 2011.
International Search Report for International Application No. PCT/US2012/063290, European Patent Office, Netherlands, mailed on Jun. 7, 2013.

* cited by examiner

*Primary Examiner* — Li Liu
(74) *Attorney, Agent, or Firm* — Sterne, Kessler, Goldstein & Fox P.L.L.C.

(57) ABSTRACT

Methods, systems, and articles of manufacture for image compression and decompression using sub-resolution images are disclosed. Compressing of images includes, determining a plurality of entropy code sets based upon statistically similar regions in the input image, generating one or more sub-resolution images including a first sub-resolution image comprising the plurality of entropy code sets, encoding the input image using the generated one or more sub-resolution images to control one or more compression parameters including an entropy code, and outputting the encoded input image and the generated one or more sub-resolution images as a compressed entropy coded image file. Decompressing of images include, decomposing an image file to access the encoded compressed input image and respective sub-resolution images for each of a plurality of compression parameters, and decoding the encoded compressed input image using the respective sub-resolution images to control each of the plurality of compression parameters.

28 Claims, 13 Drawing Sheets

IMAGE COMPRESSION USING SUB-RESOLUTION IMAGES

BACKGROUND

1. Field

This disclosure relates generally to image compression.

2. Background

Widespread availability of digital cameras, camera-equipped mobile phones and handheld devices, and other convenient image capture devices have led to a large number of images that are regularly uploaded onto various web-based image applications. Applications such as these highlight the continuing need for image compression techniques that have improved efficiency, quality, and flexibility.

The Portable Network Graphics (PNG) format is a frequently used format for storing and transporting images on networks such as the Internet. Other image formats, such as Graphics Interchange Format (GIF), Tagged Image File Format (TIFF), and Joint Photographic Experts Group (JPEG), are also frequently used in the Internet environment. PNG and GIF are considered lossless compression methods, whereas JPEG is a lossy compression method. TIFF may sometimes use lossy or lossless compression. Each of these techniques offers many benefits in image compression. However, each of these techniques have weaknesses in efficiency, quality, or flexibility.

Therefore, an image compression technique that can be widely adopted and supported, and that offers improved efficiencies and quality over currently available techniques is desired.

SUMMARY OF EMBODIMENTS

Methods, systems, and articles of manufacture for image compression and decompression using sub-resolution images are disclosed. For image compression these include, determining a plurality of entropy code sets based upon statistically similar regions in the input image, generating one or more sub-resolution images including a first sub-resolution image comprising the plurality of entropy code sets, encoding the input image using the generated one or more sub-resolution images to control one or more compression parameters including an entropy code, and outputting the encoded input image and the generated one or more sub-resolution images as a compressed entropy coded image file.

Another embodiment for image compression includes, generating respective sub-resolution images for each of a plurality of compression parameters from the input image, encoding the input image using the respective sub-resolution images to control each of the plurality of compression parameters, and outputting the encoded input image and the generated sub-resolution images as a compressed entropy coded image file.

Embodiments for image decompression include, decomposing an image file to access the encoded compressed input image and respective sub-resolution images for each of a plurality of compression parameters, decoding the encoded compressed input image using the respective sub-resolution images to control each of the plurality of compression parameters, and outputting the decoded input image Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the present disclosure is generally described in the context of these embodiments, it should be understood that these embodiments are not limiting as to scope.

DETAILED DESCRIPTION

Figure 1:
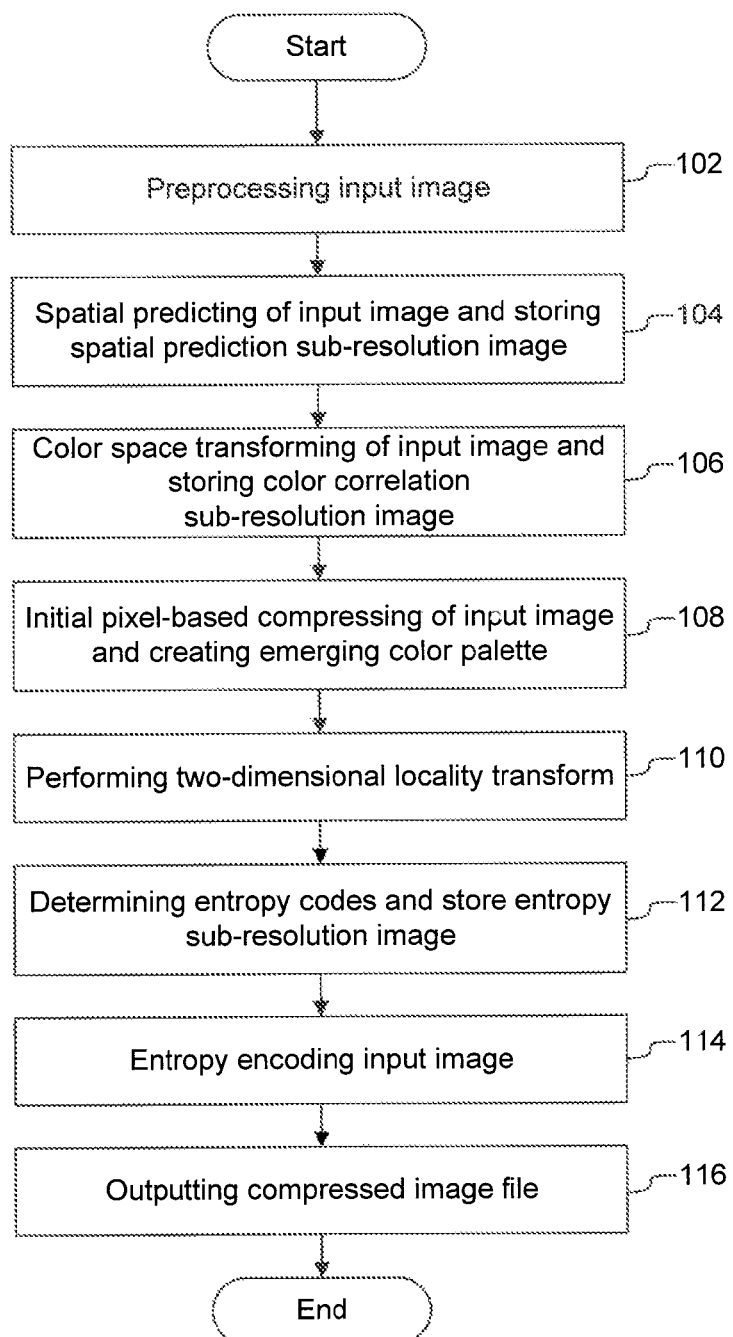
FIG. 1 is a flowchart illustrating an image compression and encoding technique in accordance with an embodiment.

While illustrative embodiments for particular applications are described in the present disclosure, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

The present disclosure is generally directed to methods, systems, and articles of manufacture for the compression of images. Embodiments, including those specifically disclosed herein, achieve lossless or near lossless image compression while also achieving substantial advantages in processing efficiency, image quality and storage. Some differences between the currently popular PNG image compression and the embodiments are illustrative.

Embodiments generate separate sets of entropy codes for areas of the input image that have similar statistics. The respective generated entropy codes are stored in a sub-resolution image (i.e., images having lower resolution and thus smaller than the input image), which are then used to control the entropy encoding of the pixels in the input image. By doing so, the entropy characteristics of pixels that are in proximity in the two-dimensional space of the image are advantageously utilized in the embodiments. PNG, in contrast, encodes entropy for blocks of linear memory, i.e., the image is converted to a byte stream and then entropy coded. The entropy characteristics present in two-dimensional proximity in the input images are not effectively utilized in PNG because the linear byte stream is entropy encoded. Moreover, by using a sub-resolution image to specify entropy codes for the different areas, embodiments are able to more cost-effectively change entropy codes during the decoding process.

With regard to spatial prediction too, similarities that occur in two-dimensional proximity in an image are effectively utilized in the embodiments to specify a spatial predictor for each rectangular block. The spatial predictors are stored in a sub-resolution image, which is then used to control the spatial prediction. In contrast, PNG specifies a spatial predictor for each row of the input image without particular consideration of statistical similarities of local areas.

Embodiments leverage the correlations between the different color channels by using a cross-color component predictor to predict the spatial prediction error. Embodiments encode each color channel using a separate entropy code in order to advantageously use inter-relationships between components of the same color within the input image. PNG uses a common entropy code for all color channels.

Whereas PNG defines a static palette of colors, embodiments introduce locally defined color palettes for areas of the input image. The palette is dynamically generated using a hashing technique, which may lead to improved color characteristics.

Moreover, embodiments use sub-resolution images to control various aspects of the image compression and entropy encoding. The sub-resolution images may be stored using the same techniques as those used to store the input image.

FIGS. 1-7 illustrate various aspects of the embodiments of the method of compression. FIGS. 8-10 and 13 illustrate systems according to embodiments.

FIG. 1 illustrates a method 100 for image compression and entropy encoding in accordance with an embodiment. The method can be implemented, for example, using a system as described below in relation to FIGS. 8-10 and 13. Method 100 may not occur in the order shown, and may not require all of the steps.

At step 102, preprocessing is performed on an input image. The input image can be a digitized photograph or other digital image. The input image may be represented in memory as a logical rectangular array of pixels. A pixel may be one or more bytes. According to an embodiment, a pixel is 4 bytes and includes red, green, blue, and alpha channels. The preprocessing step 102 may process pixels of the input image such that, after the preprocessing, the input image yields improved compression. According to an embodiment, alpha replacement, color discretization, and palette selection may be performed in step 102. Preprocessing step 102 is further described below in relation to FIG. 2.

At step 104, the input image, or more specifically, the preprocessed input image, is subjected to spatial prediction. Specifically, as known to persons skilled in the art, spatial prediction refers to predicting a pixel based upon one or more previously occurring pixels. The difference between the predicted value and the actual value is recorded in the pixel position in the spatially predicted image. Moreover, a sub-resolution image of the selected spatial predictors is stored.

The input image can be divided into rectangular areas of a predetermined size ("blocks"). Blocks may be of any size, such as, for example, 16×16 pixels. Blocks of the same or different sizes may be used in spatial prediction, color space transformation, and entropy code selection.

For each pixel in each block, a set of spatial predictors is tried. The set of spatial predictors that is tried can be preconfigured or can be dynamically determined. According to an embodiment, the set of spatial predictors includes individual pixels or combinations of pixels that are to the left of the current pixel (the term "current pixel" is used to refer to the pixel that is currently being processed) and/or pixels that are one or more rows above the current pixel. Note that pixels that are either to the left of or above the current pixel are, according to the left-right top-down processing order of pixels in an image, processed before the current pixel.

The spatial predictor selected for a block may be the spatial predictor that yields the least sum entropy in the differences between the spatially predicted values and the respective actual values of the pixels in the block. Thus, in embodiments, spatial predictors are determined in a manner that optimizes the entropy locally to each block.

In some embodiments, criteria that are considered in selecting the spatial predictor for the current block include minimizing the absolute value of the differences between the spatially predicted values and actual values, and a bias to favor predetermined neighboring pixels as the predictor and/or as a part of the predictor. The minimizing of the absolute value of the differences may reduce the entropy globally throughout the image. According to an embodiment, the minimizing of absolute values may be based upon minimizing the absolute value of the difference for each pixel within a block, or upon minimizing the sum absolute value of the difference for the block. According to another embodiment, minimizing of absolute values may be achieved at least in part by minimizing a weighted sum of population counts of difference values. The weighting, for example, may be exponential or Gaussian to favor small absolute values over large absolute values.

The spatial predictors selected for each block are then recorded in a spatial predictor sub-resolution image. Further details of spatial prediction are described below in relation to FIG. 3.

At step 106, color space transformation of the input image is performed. Color space transformation of the input image can be performed before or after spatial prediction. In the described embodiments, the input to the color space transformation is an intermediate input image that includes spatial prediction differences as pixel values.

Color space transformation includes identifying and recording correlations among the color components. For example, correlations between green and red, green and blue, and red and blue are identified and recorded as color correlation factors. Thus, a pixel that originally included three separate color values for green, red, and blue, may, after color transformation be represented by the original color value for green and by values determined using correlation factors for red and blue. Red may be represented as a correlation factor relating red to green, and blue may be represented as one or more of a correlation factor relating blue to red or a correlation factor relating blue to green.

The correlation factors are stored in a sub-resolution image. The color values in the input image are changed to include the prediction errors for red and blue, based upon the respective correlation factors. Color space transformation is further described in relation to FIG. 4 below.

At step 108, an initial pixel-based compression of the input image is performed. In the embodiment described herein, the input to the initial pixel-based compression is the input image that has already been subjected to spatial prediction and color transformation processing. However, step 108 may be performed at other positions in the flow of method 100 and may, therefore, have the input image pre- or post-steps 104 and 106 in other embodiments.

For each pixel, the initial pixel-based compression operates to insert one of, a backward reference, the pixel, or a palette reference. Persons skilled in the art would recognize that compression by inserting backward references is performed in the conventional LZ77 based on bytes. In contrast to LZ77, in embodiments the insertion of the backward references is based upon pixels. The pixel-based compression enables better use of two-dimensional proximity characteristics in the image to improve compression. According to an embodiment, a palette (referred to herein as the "emerging color palette") may be dynamically populated during the pixel-based compression. The initial pixel-based compression of the input image is further described below in relation to FIG. 5.

At step 110, the compressed input image that is output from step 108 is subjected to a two-dimensional locality transform. The two-dimensional locality transform operates to identify position information in the compressed image, and encode that position information with a code representing a corresponding two-dimensional distance. For example, a backward reference may be originally inserted during the compression (e.g., step 108) as a pixel distance. The two-dimensional locality transform may replace that pixel distance with short code for a corresponding two-dimensional distance. A preconfigured two-dimensional locality code table specifies the relationship between respective short codes and selected corresponding relative pixel distances. According to an embodiment, the preconfigured table specifies short codes for a 16×8 pixel neighborhood around the current pixel. These short codes are arranged by their Euclidian distance to the current pixel. Using short codes for the immediately neighboring areas, for example, enables cheaper (in terms of bits) references to pixels from the one or more previous rows immediately above.

At step 112, entropy codes are determined and a sub-resolution image for entropy codes is recorded. Entropy codes are determined for local areas (e.g., blocks or clusters of blocks) of the image that have similar statistics. The entropy codes, or references to the entropy codes used to encode each pixel, are stored in a sub-resolution image referred to as the entropy sub-resolution image. Entropy code determination is further described below in relation to FIG. 6.

At step 114, the input image is entropy coded. The input to the entropy coding, according to an embodiment, can be the input image that has been subjected to spatial prediction, color transformation, pixel compression, and the two-dimensional locality transform.

The entropy coding operates on the input image pixel-by-pixel in a left to right and top to bottom manner. At each location of the image, an entropy encoding is determined based upon an entropy code referenced in the entropy sub-resolution image. As described below in relation to FIG. 6, an entropy code set is determined for each block of the input image. An entropy code set may include respective entropy codes for colors, distances, and the like. The entropy sub-resolution image may specify the entropy code set to be used for the corresponding pixel in the input image. The entropy code is accessed based upon the block of the current pixel. Entropy codes may be based upon, for example, Huffman codes and arithmetic codes.

At step 116, the entropy coded compressed image is output to a memory, persistent memory, or transmitted to another entity. Outputting the entropy coded image can include forming a compressed entropy coded image file, such as that described in relation to FIG. 10, which includes the compressed entropy coded input image, the sub-resolution images, and other information that is needed for decompressing to recover the input image.

Figure 2:
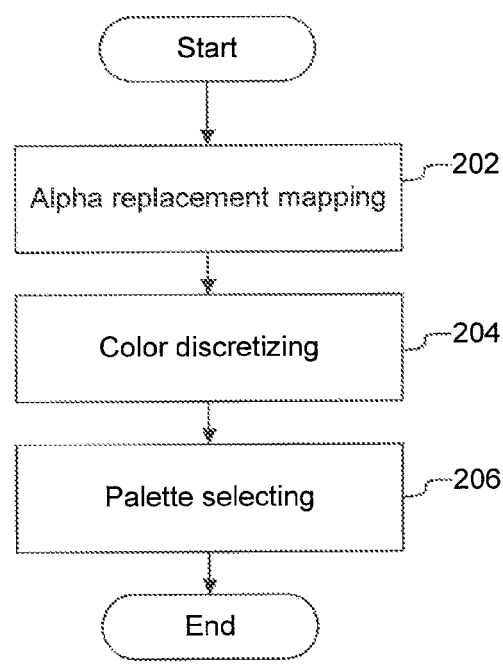
FIG. 2 is a flowchart illustrating a preprocessing technique used in the image compression and encoding technique of FIG. 1 in accordance with an embodiment.

FIG. 2 illustrates a flowchart of a method 200 for preprocessing the input image. According to an embodiment, method 200 can be used in performing step 102 of method 100 described above. Method 200 may not occur in the order shown, and may not require all of the steps.

At step 202, alpha replacement is performed on the input image. Alpha replacement is a technique to reduce entropy in the input image. Alpha replacement operates to replace some of the alpha values, such as alpha values that are unique or those that rarely occur in the image, with alpha values that appear more commonly in the image. According to an embodiment, for example, special color values that also have translucent values, such as those that appear in image formats such as PNG, TIFF, and GIF, are processed to remove the originally included translucency value by correcting them to include corresponding specific translucency values. This process operates to reduce the entropy in the alpha channel.

Any number of pixels can be marked as translucent and thereby made subject to alpha replacement. According to an embodiment, translucency is not specified as separate color values for red, green, and blue, and is instead specified as an offset to the corresponding alpha value. Specifying translucent red, green, and blue, using offsets to alpha, enables the embodiment to preserve the translucency information even when there exists multiple of alpha for a particular RGB triplet. As a side effect of using an offset to specify the alpha value, the entropy of the alpha channel may be reduced.

At step 204, color discretizing may be performed. According to an embodiment, color discretizing and compatification operates to pack the dynamic range of colors such that prediction would yield only, or mostly, such color values and/or prediction error values as those that are in the original image. This avoids, or reduces the need for, the prediction image to have more unique symbols than the original image.

For example, in embodiments that have no color discretizing and compatification, a predictor may consider two color values and predict the average of those two considered values as the predicted color for a pixel. However, the average value may not be a color that was anywhere in the original image, and therefore the predicted signal would have introduced a new symbol. Packing the dynamic range of the colors such that the possibility of predictions and/or prediction errors yielding new values that are not already in the original image leads to minimizing the addition of new symbols. Consequently the predicted image may have reduced entropy when compared to conventional techniques.

At step 206, optionally, palette selection is performed. According to an embodiment, palette selection is performed when only a few colors are required to be encoded in the image. Palette selection allows multiple pixels to be packed into a single pixel.

Figure 3:
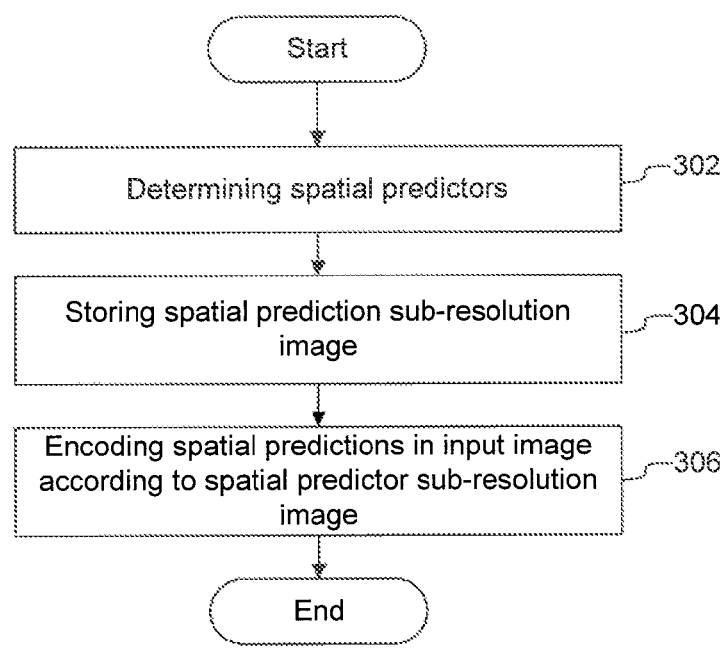
FIG. 3 is a flowchart illustrating a spatial prediction technique used in the image compression and encoding technique of FIG. 1 in accordance with an embodiment.

FIG. 3 illustrates a method 300 for performing spatial prediction. According to an embodiment, method 300 can be used in performing step 104 of method 100 described above. Method 300 may not occur in the order shown, and may not require all of the steps.

At step 302, spatial predictors are determined. As described above in relation to step 104, disclosed embodiments operate to find spatial predictors such that the prediction differences in a block are minimized. In another embodiment, other criteria, such as, but not limited to, minimizing the entropy of spatial prediction differences within the block, minimizing, the absolute value of the spatial prediction differences and biasing selection criteria in favor of neighboring pixel blocks may be used in order to optimize the selection of the spatial predictor to local characteristics of the block and, optionally, to global characteristics.

As described above, the pixel(s) selected for predicting the current pixel can be from any of previously processed pixel positions. According to an embodiment, a preconfigured spatial predictor code table specifies a code for each of a plurality of pixel positions and pixel combinations. For example, a spatial predictor code table may include a code for no prediction, a plurality of codes for copying individual pixels, and a plurality of codes for averaging two or more pixels. Thus, prediction of the current pixel may be based upon one or more pixels.

The spatial predictors with which to encode the input image are selected on a per-block basis, based upon a cost function determined by one or more of the criteria described above. In a block, all the pixels are associated with the same selected spatial predictor.

At step 304, the selected spatial predictors for each block are stored in a spatial predictor sub-resolution image. A pixel in the sub-resolution image represents a block in the input image.

The same storing technique used for storing the compressed entropy coded input image can be used for storing the respective sub-resolution images. A generic technique for storing compressed entropy coded images, including for sub-resolution images, is disclosed in relation to FIG. 7 below.

At step 306, the input image (with or without preprocessing) is processed to encode spatial predictions according to the spatial predictor sub-resolution image. For each pixel in the block, a predicted value is determined based upon the corresponding spatial predictor stored in the spatial predictor sub-resolution image. The difference between the predicted value and the actual value is then encoded into the pixel. As the spatial prediction proceeds to process pixels across the input image, the spatial predictor sub-resolution image controls the applied spatial predictor for each block.

Figure 4:
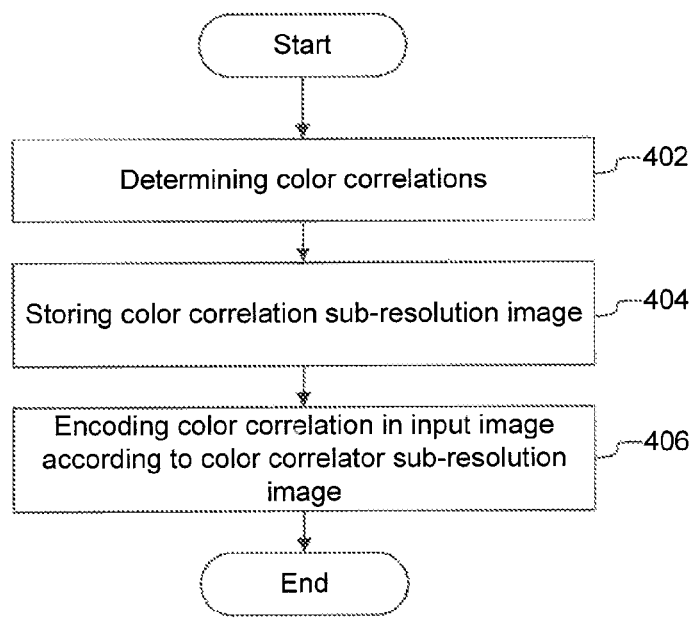
FIG. 4 is a flowchart illustrating a color transformation technique used in the image compression and encoding technique of FIG. 1 in accordance with an embodiment.

FIG. 4 illustrates a method 400 for color space transformation of an image. According to an embodiment, method 400 can be used in performing step 106 of method 100 described above. Method 400 may not occur in the order shown, and may not require all of the steps.

At step 402, color correlations are determined. Color correlators between color components are determined on a block basis. For each block, the pixels, or more specifically, the red, green, blue (RGB) values, are analyzed to determine correlations between them. According to an embodiment, correlations between green and red, red and blue, and green and blue are determined. Color correlators operate to reduce the entropy in the red and blue channels. For example, by representing red as a factor of the green value in that pixel, embodiments reduce entropy in the red channel. For example, consider two blocks where one has a RGB of 8:6:2 and 4:3:0, respectively, as encoded in conventional systems. According to an embodiment, this information can be encoded as 8:X:Y and 4:X:Y, where X and Y are codes for 75% and 25%. Thus, the color transformation can reduce the entropy of the red and blue channels by taking advantage of color relationships between adjacent blocks.

A common set of color correlators are determined for each block. The correlators for the block may be selected, for example, based upon an average or based upon the most frequently occurring color values in the current block. According to an embodiment, correlators for a block may be determined in a manner that minimizes a heuristic that combines the entropy and the absolute values of the red and blue components. For example, all values of green to red in the block can be tested and the one yielding the lowest heuristic can be selected. Also, all combinations of green to blue and red to blue in the block can be tested and the combination with the lowest heuristic can be selected. Moreover, in some embodiments, correlator values that are similar to selected correlators from blocks that are above or to the left of the current block can be slightly favored for selection.

At step 404, the selected correlation factors are stored in a color correlation sub-resolution image. In the color correlation sub-resolution image, each pixel represents a block in the input image. Each pixel in the sub-resolution image stores the correlation factors of green to red, green to blue, and red to blue, respectively. These factors may be stored in a manner such that positive or negative correlations can be indicated.

At step 406, the color transformation is encoded in the input image. The red and blue channels in the input image are now modified to represent the prediction error of the color correlation prediction. Specifically, the color predictions are encoded as described below. Green is not predicted and therefore the stored value is the actual green value. Red is predicted from the green based upon the green to red correlation factor corresponding to the current block specified in the color correlation sub-resolution image. The difference between the red predicted value based upon the color correlation factor and the previously encoded spatial prediction error for the red component is now encoded. Blue may be predicted from one or more of green and red. If both green and red are used in predicting the blue value, according to an embodiment, the average of the green to blue and red to blue predictions is taken as the predicted value for the blue component. The mode in which blue is predicted may be preconfigured. Thus, encoding of the red and blue channels is controlled according to the correlation factors specified in the color correlation sub-resolution image.

Figure 5:
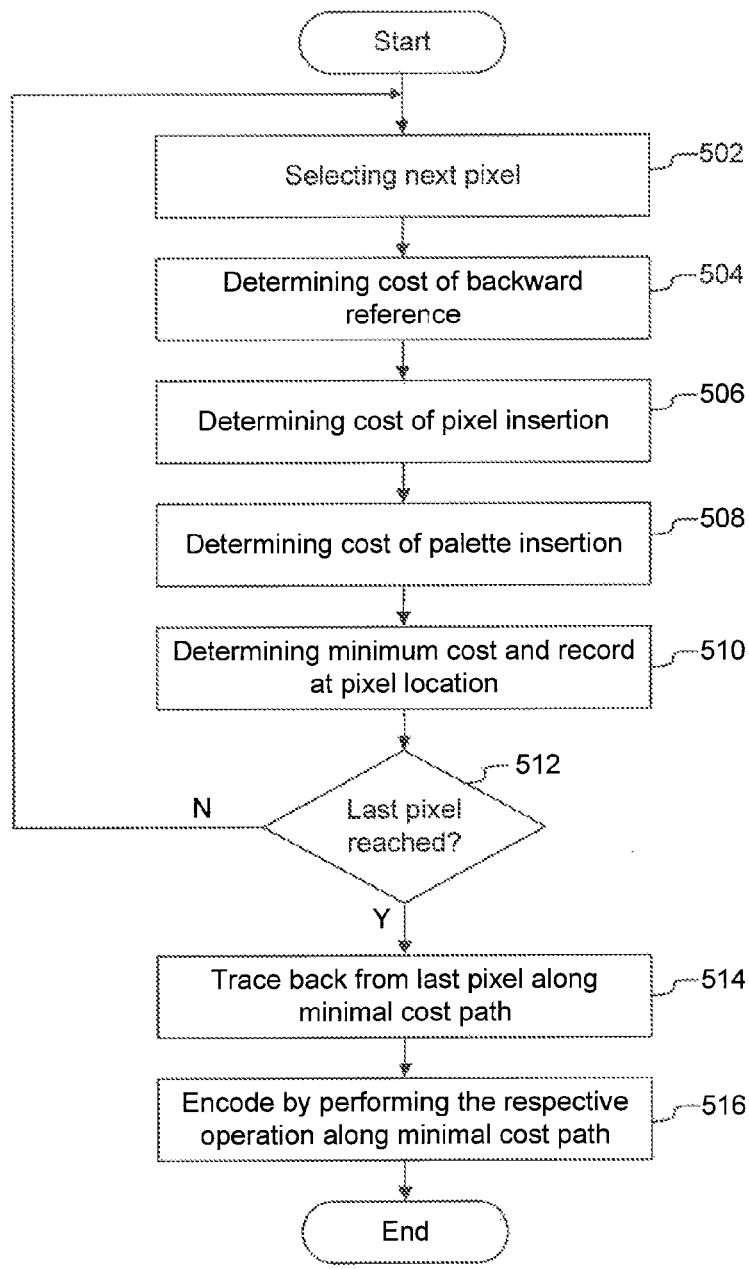
FIG. 5 is a flowchart illustrating an initial pixel-based compression technique used in the image compression and encoding technique of FIG. 1 in accordance with an embodiment.

FIG. 5 illustrates a method 500 for pixel-based compression of an input image. According to an embodiment, method 500 can be used in performing step 108 of method 100. Steps 502-516 illustrate the processing of an image by traversing pixels in a left to right and top to bottom pattern of movement. Method 500 may not occur in the order shown, and may not require all of the steps.

At step 502, the next pixel to be processed is selected. Processing would typically start at the top left pixel. In other iterations, a subsequent pixel is selected. The selected next pixel is referred to as the current pixel.

Steps 504-508 determine the cost of each operation that can be performed upon the current pixel in the process of compressing the input image. According to an embodiment, three separate options can be considered: 1) inserting a backward reference; 2) inserting the pixel; and 3) inserting a palette entry.

A "backward reference" indicates that a specified one or more pixels can be copied at the location of the current pixel in order to compress the image. For example, if the current pixel is the beginning of a string of three pixels that all are color C, and at a previously processed location 200 pixels before the current pixel there was a string of three color C pixels, embodiments can insert a backward reference indicating a reference to 200 pixels ago that matches the current pixel, and a length of the string of 3 pixels starting at the referenced pixel. A backward reference is specified by a distance and a length value. Distance refers to the distance from the current pixel to the referenced pixel, and the length refers to the number of pixels from the current pixel to which the referenced pixel can be copied.

Inserting the pixel refers to inserting the current pixel in the compressed image. In some situations, this can be the most cost-efficient operation for a pixel.

Inserting a palette entry refers to inserting an index in the compressed image. In some embodiments, inserting a palette entry can also include inserting the corresponding color entry in a palette. The emerging color palette is dynamically built as the pixel-based compression proceeds through the image. At each pixel location, the cost of inserting the color value into the emerging palette and inserting the corresponding palette index in the compressed image is considered. The size of the emerging palette may be preconfigured. According to an embodiment, a 32-bit integer representing the red/green/blue/alpha values is multiplied by a predetermined multiplier. Based upon the size, some bits from the resulting integer are used as an index into an array which represents the emerging color palette. For example, for an emerging palette size of 128, 7 bits can be used as the index value. For each color value from the uncompressed pixel stream, an index may be determined in one of several ways. According to an embodiment, the index of a color is determined based upon 7 adjacent successive bits from a predefined start position of the color's byte representation described above. According to another embodiment, a modulo operation may be performed on the color value to determine a hash index into the emerging palette. According to an embodiment, one emerging color palette can be used for the input image. In other embodiments, a separate emerging palette may be defined for respective areas. For example, a new emerging palette may be created for every 32 pixels along the x-axis of the input image.

At step 504, the cost of inserting a backward reference at the current pixel is determined. As described above, inserting a backward reference includes inserting a distance to a pixel and a length. The length refers to the number of pixels that can be copied starting from the referenced pixel. The cost includes the cost of inserting the distance and length at the position in the compressed image that corresponds to the current pixel. This cost of inserting bits is considered in combination with the cost savings in not having to copy a number of pixels equal to the number of pixels from the backward reference that can be copied starting at the location of the current pixel. For example, if the backward reference takes 5 bytes to encode, and a length of 3 pixels is indicated, then, in the case of pixels of size 1 byte, the cost of backward reference insertion would be 5−3=2 bytes. According to another embodiment, the cost of the backward reference is based only on the insertion cost, i.e., if the backward reference takes 5 bytes to encode, the insertion cost is 5 bytes.

According to an embodiment, the longest backward reference is selected. According to another embodiment, two or more backward references, possibly having different distance and length characteristics, are compared and the most cost-efficient one is selected.

At step 506, the cost of inserting the pixel in the input image is determined. This cost can be considered as the bit cost of inserting one pixel.

At step 508, the cost of inserting an emerging palette index is determined. The cost of inserting an emerging palette entry can be considered as the size of the index entry.

At step 510, based on the cost determinations at steps 504-508, the minimum cost operation is determined and the minimum cost operation is recorded at the current pixel location. The cost is determined based upon the bit costs.

At step 512, it is determined whether the last pixel of the input image has been reached. If not, steps 502-512 are repeated for the next pixel in the traversal pattern.

If, at step 512, it is determined that the current pixel is the last pixel, then processing proceeds to step 514. At step 514, the path from the last pixel is traced back to determine the reverse of the minimal cost path to compress the image.

At step 514, the determined path is then reversed to yield the compression operations to be performed in order to traverse the minimum cost path of compression for the image. The path may include one or more of encoding backward references, encoding pixel values, and encoding palette index values at pixel locations. At the end of step 514, the input image has completed pixel-based compression.

Figure 6:
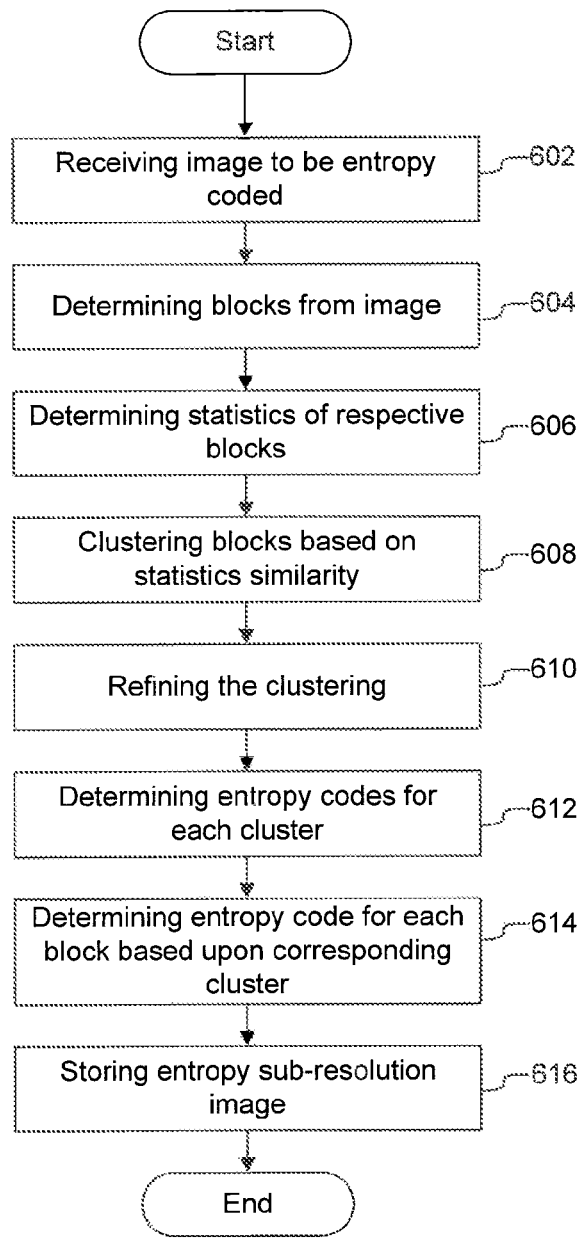
FIG. 6 is a flowchart illustrating a technique for determining entropy codes used in the image compression and encoding technique of FIG. 1 in accordance with an embodiment.

FIG. 6 illustrates a method 600 for determining entropy codes. According to an embodiment, method 600 can be used in performing step 112 of method 100 described above. Method 600 may not occur in the order shown, and may not require all of the steps.

At step 602, an image is received to be entropy coded. According to an embodiment, the received image has been through a pixel-based compression process. Prior to the pixel-based compression, the input image may have been subjected to spatial prediction and color space transformation. However, method 600 is applicable to other types of input images.

At step 604, blocks are determined from the input image. According to an embodiment, blocks of size 16×16 are determined. Other block sizes are possible.

At step 606, statistics are determined for the respective blocks. Statistics may be determined separately for the red, green, blue, alpha color components, for distance codes, backward reference length codes, and for palette hash values. Statistics may be determined in histogram form where number of pixels for each statistic may be counted.

At step 608, the blocks are clustered according to the similarity of the statistics of the respective blocks. According to an embodiment, a stochastic clustering is performed. The stochastic clustering may be performed by initially considering each block as a cluster, and then iteratively selecting a cluster at random. Then, the most similar cluster is found from among a selected number of clusters, and the selected cluster and the found cluster are combined. This clustering operation can proceed until the number of clusters is reduced to a determined threshold number of clusters. The threshold number of clusters can also be determined based upon a cost function. For example, a cost to store an entropy code for each cluster can be modeled, where the size of the respective entropy codes depend on the distribution of blocks to clusters. In an embodiment, for example, the stochastic algorithm operates to reduce the number of clusters from about 1000 to about 50 clusters.

At step 610, the clustering is refined. This step operates to refine the stochastically determined clusters by moving blocks (or block statistics) to clusters in order to improve the accuracy of the match between the block and its cluster. A clustering algorithm such as a k-means algorithm can be used in this step. According to another embodiment, each block is analyzed to determine the optimal cluster for it and moved there so that the expected number of bits to output (store) is minimized. After each move the statistics are adjusted to compensate for the move. This operation may be repeated for a predetermined number of times, or until the expected number of bits to output keeps reducing, for all blocks to result in a refined clustering.

At step 612, an entropy code is determined for each cluster. Thus, because the clusters have grouped together blocks with similar characteristics, the resulting entropy codes are determined specifically for the characteristics of each respective cluster. Moreover, within each cluster separate entropy codes are determined for green, red, blue, alpha, and distance components. In embodiments, the same entropy code can be used for green, palette index, and length components. Any technique can be used to determine an entropy code, such as, but not limited to, a Huffman code, that is specific to each cluster and within each cluster to each of the color and distance components.

At step 614, the entropy code for each block is determined. Specifically, a set of entropy codes ("entropy code set") comprising separate entropy codes for the red, green, blue, alpha color components, for distance codes, backward reference length codes, and for palette hash values. This can be determined by identifying the cluster to which the particular block belongs.

At step 616, the entropy code sets are stored and the entropy code that is applied to each pixel is specified in an entropy code sub-resolution image. The entropy code sub-resolution image stores, for example, one pixel for each 16×16 block in the input image. Each pixel in the entropy code sub-resolution image specifies the set of entropy codes that is to be applied to the corresponding block in the input image. For example, the green component of a pixel in the sub-resolution image may be updated with a reference to the position of the corresponding set of entropy codes in the stored entropy code sets. The set of entropy codes can include five separate entropy codes: entropy code for green/pixel index/backward reference length; and entropy code for red, blue, alpha and distance components. Each of these entropy codes may be codified separately using Huffman coding and run-length coding.

The entropy code sub-resolution image can be stored using the same technique that is used in storing the other sub-resolution images and the compressed entropy coded input image. Storing of images is described in relation to FIG. 7 below.

Figure 7:
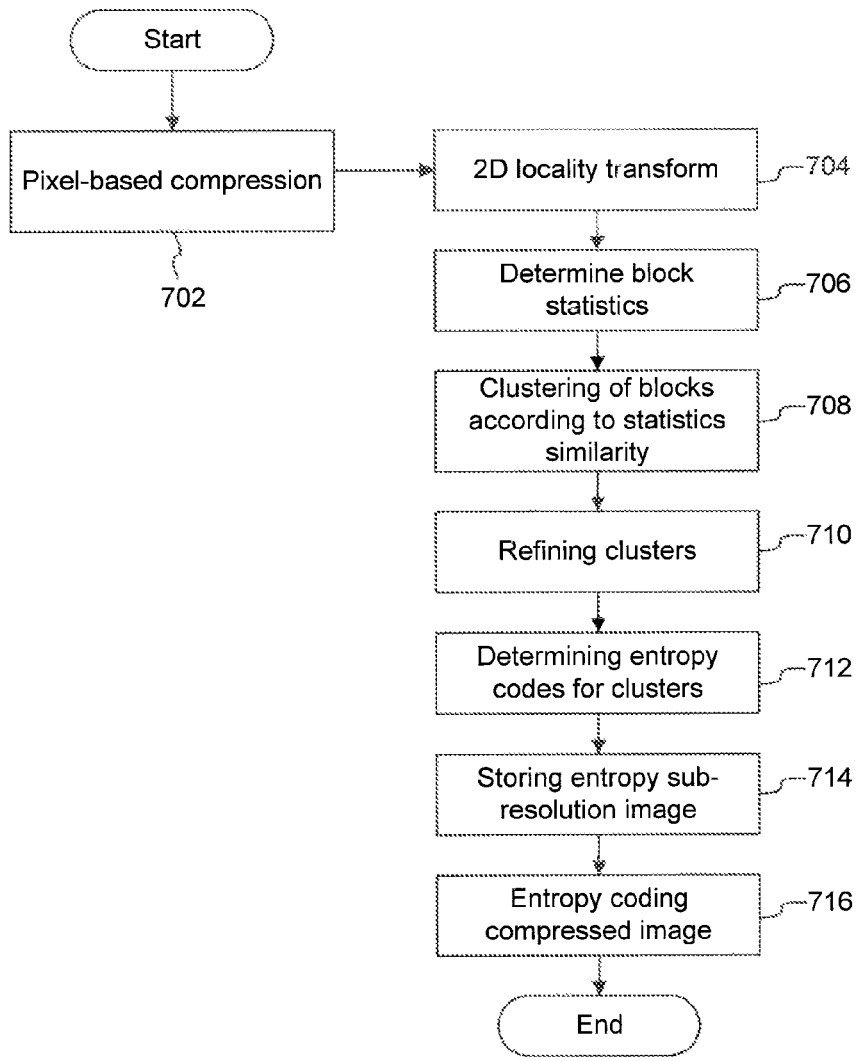
FIG. 7 is a flowchart illustrating a generic image encoding technique used in the image compression and encoding technique of FIG. 1 in accordance with an embodiment.

FIG. 7 illustrates a method 700 for storing images in compressed and entropy coded form. According to an embodiment, method 700 can be used to store the compressed entropy coded input image as well as the sub-resolution images (e.g., entropy sub-resolution image, color correlation sub-resolution image, and spatial predictor sub-resolution image). Method 700 may not occur in the order shown, and may not require all of the steps.

At step 702, an input image is subjected to pixel-based compression. An exemplary pixel-based compression, although similar in aspects to LZ77, is applied to pixels instead of bytes. FIG. 5 illustrates an exemplary pixel-based compression method. The output of the pixel-based compression is a pixel stream having pixels, backward references, and palette index values.

At step 704, the output from the pixel-based compression is subjected to a two-dimensional locality transform. The two-dimensional locality transform converts the distances that are in pixel distances to codes based upon two-dimensional proximity. An exemplary two-dimensional transform is described above in relation to step 110 of method 100 above.

At step 706, the input image is divided to blocks (e.g., of 16×16 pixels) and statistics are determined for each block. The statistics may be collected separately for the red, green, blue, alpha, and distance components. Statistics may also be collected for length (of backward references) and pixel index values. According to an embodiment, statistics for green/length/pixel index values may be combined. Determining of statistics for blocks is described above in relation to steps 604-606 of method 600.

At step 708, the blocks are clustered according to the similarity of the statistics, and in step 710, the clusters are refined to improve the match between the blocks and the respective clusters. At step 712, entropy codes are determined for clusters. The clustering of blocks, refining of clusters, and the determining of entropy codes for respective clusters are described in relation to steps 608, 610, and 612, respectively, of method 600.

At step 714, the entropy sub-resolution image is stored. The storing of the entropy sub-resolution image may use the same storing technique as defined in method 700. Thus, method 700 defines recursive storage of images. Storing of the entropy code sub-resolution image is described above in relation to step 616 of method 600.

At step 716, the input image is entropy encoded. Entropy encoding of the input image is described above in relation to step 114 of method 100.

Figure 8:
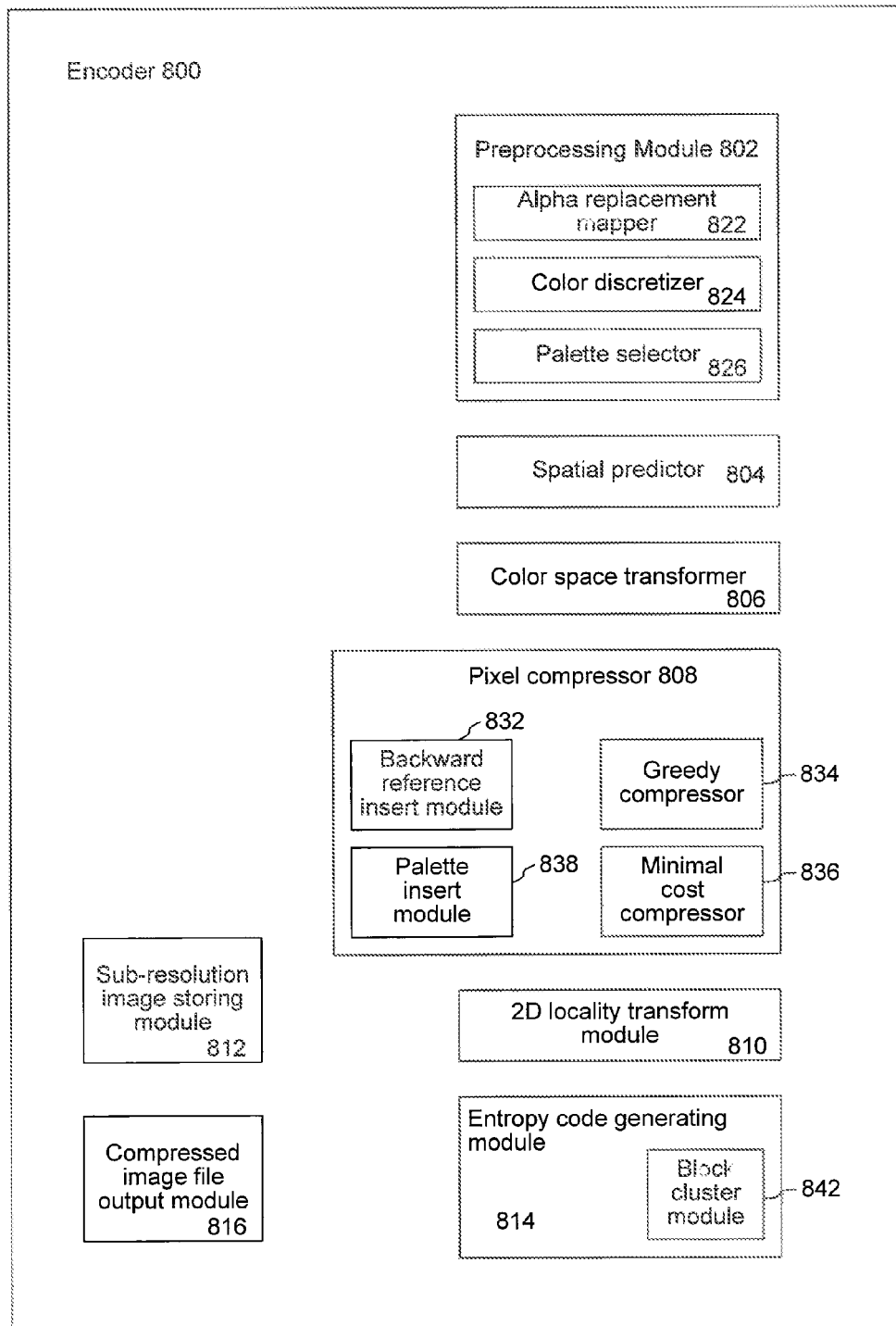
FIG. 8 is a block diagram of an encoder in accordance with an embodiment.

FIG. 8 illustrates an encoder 800 according to an embodiment. Encoder 800 comprises a preprocessing module 802, a spatial predictor 804, a color space transformer 806, a pixel compressor 808, a two-dimensional locality transform module 810, an entropy code generation module 814, an image storing module 812, and a compressed image file output module 816.

Preprocessing module 802 is configured to preprocess images so that they can be better compressed. Preprocessing module 802 can, for example, operate to reduce the entropy in the image before the image is compressed. Preprocessing module 802 includes an alpha replacement mapper 822, a color discretizer 824, and a palette selector 826.

Alpha replacement mapper 822 is configured to remove or replace selected alpha values. According to an embodiment, alpha replacement module can implement step 202 of method 200.

Color discretizer 824 is configured to reduce the resulting entropy by eliminating or reducing the predicted values that are not in the original image by adjusting the dynamic range of values for predictors. According to an embodiment, color discretizer 824 can implement step 204 of method 200.

Palette selector 826 is configured to reduce the entropy of joint distributions among adjacent pixels when an image has only less than a predetermined number of colors by packing multiple colors closer in the data structures. According to an embodiment, palette selector 826 can implement step 206 of method 200.

Spatial predictor 804 is configured to implement spatial prediction. Spatial prediction, for example, is described in relation to step 104 of method 100, and in relation to method 300.

Color space transformer 806 is configured to implement color space transformation. Color space transformation, for example, is described above in relation to step 106 of method 100 and method 400.

Pixel compressor 808 is configured to perform pixel-based compression of the input image. According to an embodiment, pixel compressor 808 is configured to implement pixel-based compression as described in relation to step 702 of method 700. Pixel compressor 808 includes backward reference insert module 832, a greedy compressor module 834, a minimal cost compressor module 836, and a palette insert module 838.

Backward reference module 832 operates to determine if a current pixel can be compressed by referencing a previously occurring pixel, and if so to insert a pixel distance to the pixel being referenced and a length. Inserting of backward references is described above in relation to step 504 of FIG. 5.

Palette insert module 838 operates to determine an index value for each pixel, and in the meantime dynamically constructs the emerging color palette as it processes the respective pixels. After determining the index reference to the palette entry for a corresponding pixel, palette insert module 838 may insert that index in the compressed image if the cost comparison against the cost of the backward reference and the cost of the pixel insert is favorable.

The generation of the emerging palette proceeds as palette insert module 838 is called to process each pixel during the compression process. Each pixel may include a color value (e.g., RGB or RGBA). The color value may represent the error in the corresponding spatial prediction and/or color transform prediction. A hash index is generated from the value of the current pixel. According to an embodiment, a predetermined number of bits are selected from a predetermined bit-position of the pixel. The selected bits are used as a hash index. The pixel (e.g., color value) is then inserted into the table based upon the hash index. Other methods of determining the hash position for each color are possible and are contemplated within the scope of this disclosure.

Minimal cost compressor 836 is configured to determine the minimum cost compression for the input image. Minimum cost compressor 836, at each pixel of the input image, selects between: a) one or more options of inserting backward references; b) inserting the current pixel; and c) inserting an index to a palette entry. The selection is based upon a cost analysis. FIG. 5 describes a method 500 that can be implemented by minimal cost compressor 836, to compress an input image.

Greedy compressor module 834 operates to compress an input image by selecting between the longest backward reference, copying of the pixel, and inserting a palette index. The operations of inserting backward references, copying of pixels and inserting of palette entries are described above in relation to steps 504, 506, and 508, respectively, of method 500. Greedy compressor module 834 may operate as a faster compression technique to be used when speed is more important than the level of compression. Therefore, when considering backward references, for example, greedy compressor module 834 may consider only the backward string with the longest matching sequence for cost comparison against pixel insertion and palette index insertion.

Two-dimensional transform module 810 is configured to replace occurrences of pixel distances with shorter codes based upon a two-dimensional distance. According to an embodiment, two-dimensional transform module 810 may implement the processing described above in relation to step 110 of method 100.

Entropy code generation module 814 is configured to generate entropy codes for respective areas of the input image that have similar statistics. According to an embodiment, a block cluster module 842 determines blocks of a predetermined size for the input image and then clusters the blocks according to the similarity of the statistics. Entropy code generation module 814 can generate a separate entropy code for each cluster and optimize the code for the characteristics of that cluster. A set of entropy codes may be generated for each cluster. Entropy code generation module 814 is further configured to generate an entropy sub-resolution image to store the entropy codes for each block of the input image. Block cluster module 842 may implement the processing described above in relation to steps 604-610 of method 600 and/or steps 706-710 of method 700. Entropy code generation module 814 may implement the processing described above in relation to steps 612-616 of method 600 and/or steps 712-716 of method 700.

Image storing module 812 is configured to store the compressed entropy coded input image, and each of the sub-resolution images generated based upon the input image. According to an embodiment, image storing module 812 may implement the processing described above in relation to method 700. As described above, method 700 stores an image using a recursive definition. For example, step 714 calls for storing the entropy code sub-resolution image using the same method 700.

Figure 10:
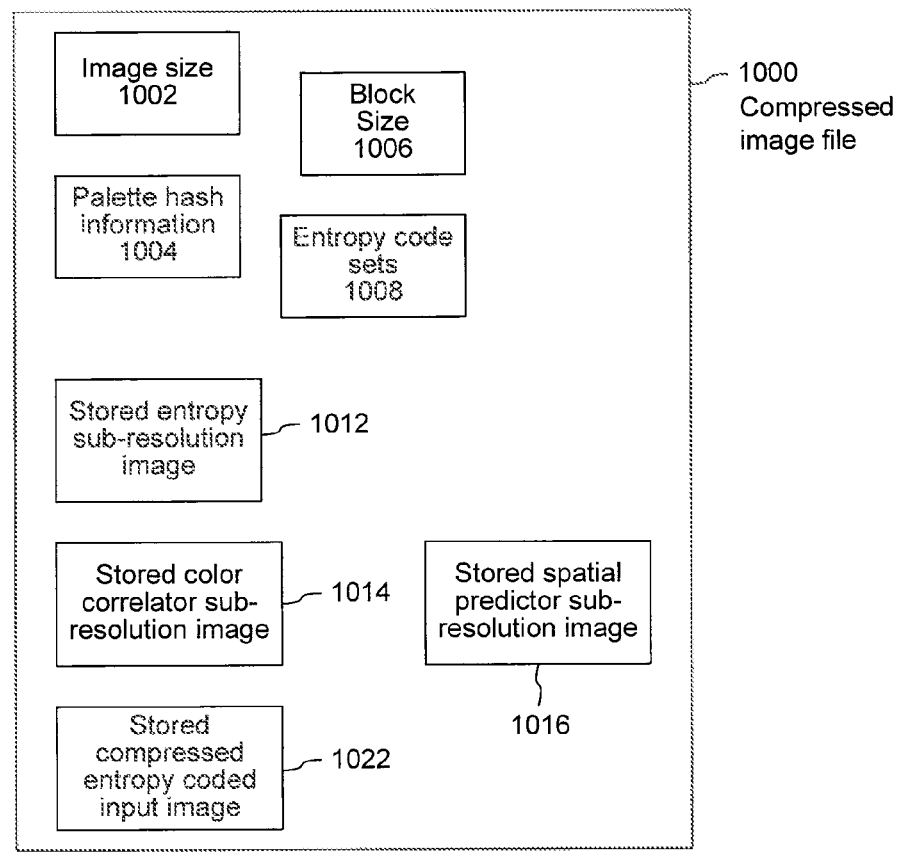
FIG. 10 is a block diagram of a compressed image file format in accordance with an embodiment.

Compressed image file output module 816 is configured to output the complete compressed entropy coded input image, for example, after processing based upon method 100, into a file or to be transmitted to another entity for decoding. The complete compressed entropy coded input image as output includes, among other things, the compressed entropy coded input image and the sub-resolution images. An exemplary file that stores compressed entropy coded input image is illustrated in FIG. 10 below.

Figure 9:
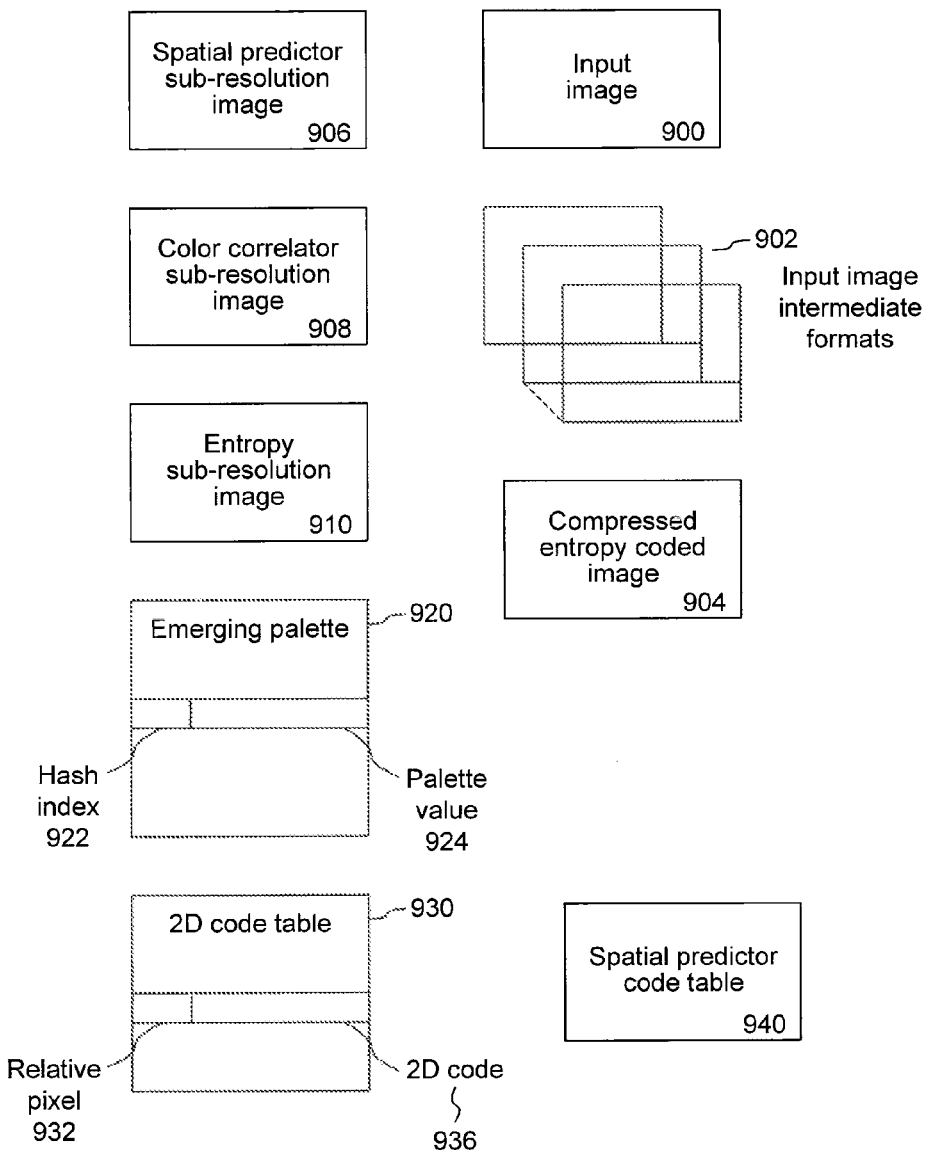
FIG. 9 is a block diagram illustrating data that can be associated with the encoder of FIG. 8 in accordance with an embodiment.

FIG. 9 illustrates data entities in the compression of images according to an embodiment. Input image 900 is an uncompressed image that is input to an encoder 800 to be compressed. The compressed entropy coded image 904 is the fully compressed and entropy coded input image. Input image intermediate formats 902 (also referred to as "intermediate images") refer to the several intermediate stages of image formats between the uncompressed input image and the compressed entropy coded image that the input image is subjected to. Examples include, the output from the preprocessing module 802 and from any of its sub-modules, the output from the spatial predictor 804, the output from the color space transformer 806, the output from the pixel compressor 808 and any of its sub-modules, and the output from the two-dimensional locality transform module 810.

Spatial predictor sub-resolution image 906, color correlation sub-resolution image 908, and entropy sub-resolution image 910, each comprises a pixel for each block (e.g., 16×16 pixel area) in the input image. Spatial predictor sub-resolution image 906 stores the spatial predictors selected for the respective blocks of the input image. Color correlation sub-resolution image 908 stores the color correlation factors for each block in the input image. Entropy sub-resolution image 910 stores references to sets of entropy codes for each block of the input image.

Emerging palette 920, according to an embodiment, is a hash table with each entry comprising a hash index 922 and a palette value 924. The palette values 924 comprise colors. Hash index 922 corresponds to an index computed using bits from one of the corresponding color values.

Two-dimensional code table 930 is configured with short codes for selected pixel distances. The short codes represent two-dimensional distances between pixel locations in the image. Each entry of two-dimensional code table 930 may include a relative pixel distance entry 932, representing the pixel distance between two pixels, and a short two-dimensional code 936 representing that distance.

Spatial predictor code table 940 is configured with codes representing a plurality of spatial predictors. As described above, a spatial predictor may be based upon an individual pixel, or a combination of two or more pixels.

FIG. 10 illustrates a block diagram of contents of a file format 1000 that can store the compressed entropy coded image 904. Image format 1000 can be used to store compressed entropy coded input image 904 in persistent memory. Moreover, image format 1000 can be used as the format in which to transmit compressed entropy coded input image 904 to another entity in order to be decompressed. A skilled person in the art would understand that other elements may be included in the file format 1000.

Image size 1002 represents the size of the image file. The size may be specified in bytes. Block size 1006 represents the size of blocks (e.g., 16×16 pixels) that was used in the compression process. Palette hash information 1004 represents information about the color palette including, but not limited to, hash index size and palette entries. Stored entropy sub-resolution image 1012, stored color correlation sub-resolution image 1014, and stored spatial predictor sub-resolution image 1016 are stored respective sub-resolution images. Stored entropy sub-resolution image may include references to entropy code sets 1008. For example, the reference may be an integer that identifies an entropy code set from entropy code sets 1008. As described above, each sub-resolution image may be stored in a recursive manner using the same process as that used to compress and store the input image. Stored compressed entropy coded input image 1022 is the bit stream of compressed entropy coded input image.

Figure 11:
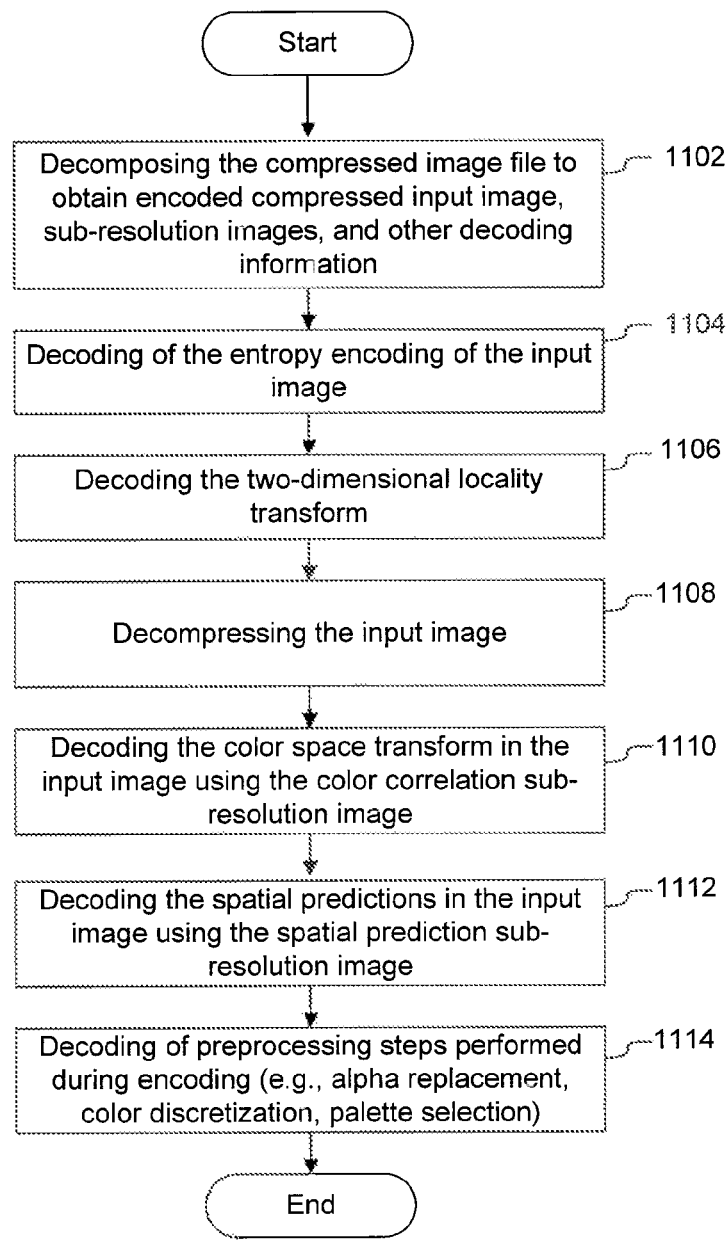
FIG. 11 is a flowchart illustrating an image decompression and decoding technique in accordance with an embodiment.

Upon receiving an image that has been encoded using method 100, e.g., such as stored compressed entropy coded input image 1022, a corresponding decoder may perform a reversing of some of the steps 116-102 to obtain the uncompressed and decoded input image. FIG. 11 illustrates a method 1100 that performs a decoding process, according to an embodiment.

At step 1102 the compressed entropy coded image file is processed to obtain the compressed entropy coded input image, the compressed sub-resolution images, and other information that is needed for decompressing to recover the input image. The compressed sub-resolution images include compressed versions of the entropy code sub-resolution image, the spatial predictor sub-resolution image, and the color correlation sub-resolution image. Contents of the compressed entropy coded image file are described above in relation to FIG. 10. As described above, each compressed sub-resolution image may have been stored by recursively using the same method 100 which is used to compress the input image. Therefore, method 1100 may be performed on each compressed entropy-coded sub-resolution image respectively to obtain the corresponding uncompressed sub-resolution images. For ease of description, steps of method 1100 are described below with respect to the decoding of the input image.

At step 1104, decoding of the entropy coded input image is performed. The entropy codes used in encoding the input image are determined based upon the corresponding pixel in the entropy code sub-resolution image. As described above, each pixel of the entropy code sub-resolution image corresponds to a block in the input image, and specifies the entropy code set used for the block. The entropy code sub-resolution image may include a reference for each block to the corresponding entropy code set. The entropy code sets may be available separately to the decoder, either in the decomposed image or through a separate transmission. By decoding the entropy codes, a compressed input image is obtained from the entropy coded input image.

At step 1106, the two-dimensional locality transform is reversed. For example, at each position in the compressed input image where a two-dimensional locality transform code is included, the value is replaced with the corresponding actual pixel distance. The two-dimensional locality transform distance codes may be available separately to the decoder, either in the decomposed image, through a separate transmission, or through configuration.

At step 1108, the compressed input image is decompressed. As described above, during compression of the input image, pixel-based compression was performed by inserting one of a backward reference, the pixel, or a palette reference, in respective pixel positions from top-left pixel to the bottom-right pixel of the input image. During decompression, the compressed input image is traversed from top-left pixel to bottom-right pixel, inserting data from a backward reference, the pixel value, or a value from a color palette. As described above in relation to the initial compression of the input image, the emerging palette is constructed as the decompression process proceeds through pixels of the compressed input image. As the compressed pixel locations are traversed, the emerging palette is dynamically constructed by populating the hash table of color values. When a location in the compressed input image is encountered in which a palette index has been inserted, it is replaced with the corresponding color value from the dynamically constructed emerging palette. The output from the pixel decompression step 1108 is a decompressed input image, which still includes the encodings of color-space transformation, spatial prediction, and other preprocessing steps performed by the encoder.

At step 1110, color space transformations in the input image are decoded. The encoded color space transformations, as described above, replaced color values by prediction errors for red and blue based upon respective correlation factors. The correlation factors are available in the color correlation sub-resolution image. Using the correlation factors stored in the color correlation sub-resolution image, the decoding process reverts the color values back to their values without the color correlations.

At step 1112, the spatial prediction that was performed during encoding is reversed. Spatial prediction is reversed using the spatial predictors that are available in the spatial prediction sub-resolution image. For each pixel, the predicted value, or more precisely, the prediction error value, is replaced with the actual corresponding pixel value.

At step 1114, the one or more preprocessing steps performed by the encoder are reversed. The preprocessing steps performed during the encoding may include, for example, one or more of alpha replacement, color discretization, and palette selection. Each of these preprocessing steps is described above in relation to the encoding method 100.

Upon completion of method 1100, a decoded version of the original input image is obtained.

Figure 12:
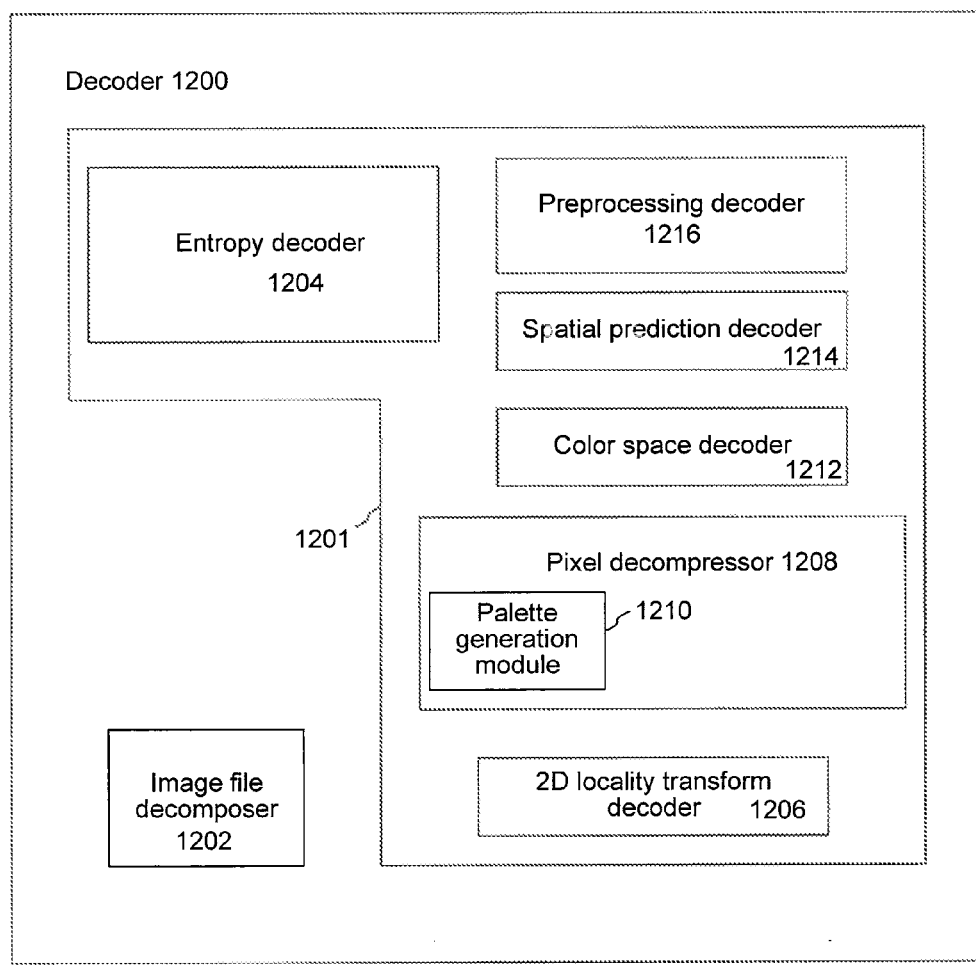
FIG. 12 is a block diagram of a decoder in accordance with an embodiment.

FIG. 12 illustrates a decoder 1200, according to an embodiment. Decoder 1200 includes an input image decoder 1201 and an image file decomposer 1202. The input image decoder 1201 comprises an entropy decoder 1204, a two-dimensional transform decoder 1206, a pixel decompressor 1208, a palette generator 1210, a color space transform decoder 1212, a spatial prediction decoder 1214, and preprocessing decoder 1216. Decoder 1200, according to an embodiment, performs method 1200 to decode an image previously encoded using a process such as method 100.

Image file decomposer 1202 operates to take as input a compressed encoded image file created by an encoding process such as method 100, and extract the encoded compressed input image, the sub-resolution images, and other stored components that aid in the decoding of the input image. FIG. 10 illustrates an exemplary format of a compressed encoded image file that is input to image file decomposer 1202. Input image decoder 1201 operated to decode the encoded compressed input image, as described below. According to an embodiment, each of the sub-resolution images are also decoded using input image decoder 1201.

Entropy decoder 1204 operates to reverse the entropy encoding performed on the compressed input image by the encoding process. The entropy decoding process uses the entropy sub-resolution image (decoded from the compressed encoded image file) to select the entropy code for each block of the input image.

Two-dimensional transform decoder 1206 operates to replace the two-dimensional transform codes that were inserted in the compressed input image by the encoder with actual pixel distances.

Pixel decompressor 1208 operates to reverse the initial compression performed by the encoder. According to an embodiment, image decompressor takes the entropy decoded compressed image after the two-dimensional distance codes have been replaced as input. During decompression, the compressed input image is traversed from top-left pixel to bottom-right pixel, inserting data from a backward reference, the pixel value, or a value from a color palette.

Palette generator 1210 operates to dynamically create the color palette (referred to above as the "emerging palette") during the decompression of the input image. As described in relation to step 1108 of method 1100, as the compressed pixel locations are traversed, the emerging palette is dynamically constructed by populating the hash table of color values.

Color space transform decoder 1212 operates to take as input a decompressed input image and reverse the color space transform coding inserted by the encoder. The color correlators stored on a per-block basis in the color space sub-resolution image is used in decoding the color space transform. Color space decoding is described above in relation to step 1110 of method 1100.

Spatial prediction decoder 1214 operates to decode the spatial predictions encoded during the encoding process. The spatial predictors for each block are available in the spatial predictor sub-resolution image.

Preprocessing decoder 1216 operates to reverse any of the preprocessing steps, such as, for example, alpha replacement, color discretization, and palette selection, which may have been performed during the encoding process. The output of the preprocessing decoder 1216 is the fully decoded input image.

Figure 13:
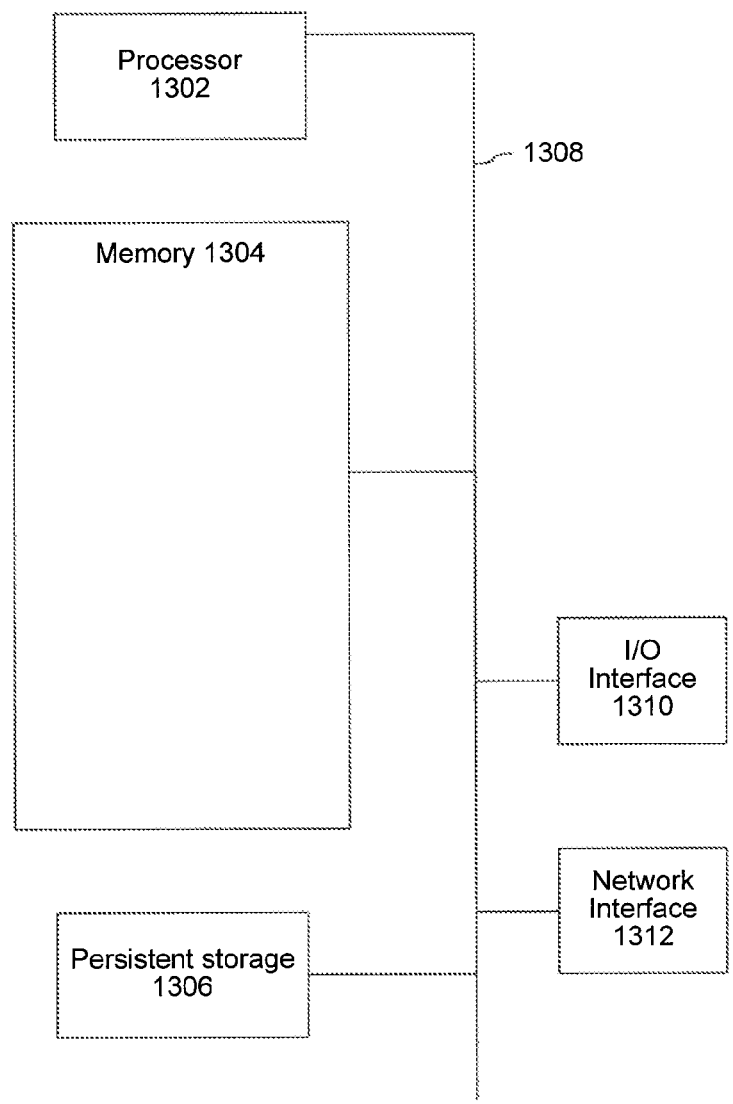
FIG. 13 is a computer system in accordance with an embodiment.

FIG. 13 illustrates a computer system 1300 in which embodiments such as the encoding methods illustrated in FIGS. 1-7, decoding method illustrated in FIG. 11, encoder 800, and/or decoder 1200 can be implemented. System 1300 includes a processor 1302 which may include any computer or electronic processor for executing instructions and for processing information, including pixel information. Processor 1302 may include or be part of any device capable of processing any sequence of instructions. Processor 1302 may include, for example, a computer processor, a processor in a mobile device or other electronic and/or digital processor. Processor 1302 may, for example, be included in a computer, a mobile computing device, a smartphone, a set-top box, an entertainment platform, a server, a camera or other image capture device, a server farm, a cloud computer and the like.

Processor 1302 may be connected to a memory 1304 via a bus 1308. Memory 1304 may include volatile memory, persistent, virtual or otherwise, to store information for use by or output by the system 1300. Memory 1304 may include, for example, random access memory (RAM) and/or dynamic RAM (DRAM). Memory 1304 may be used to store any information, such as state information of system 1300. Memory 1304 may, for example, may also be used to store instructions of system 1300, including instructions of image processing module 112. System 1300 may include one or more processors 1302 as necessary or appropriate.

Bus 1308 may include a communication infrastructure that allows interaction between the various components of system 1300. Bus 1308 may, for example, carry data between the components of system 1300, such as between processor 1302 and memory 1304. Bus 1308 may include a wireless and/or wired communications medium between the components of system 1300, and may include parallel, serial or other topological arrangements.

A persistent storage 1306 may include component's such memory or other persistent storage as is used by system 1300 to store data over some extended period of time (e.g., as compared to memory 1304). Persistent storage 1306 may include non-volatile main memory as used by processor 1302 in system 1300. Persistent storage 1306 may include, for example, flash memory, a hard disk, optical disk, or other computer readable medium.

Input/output interface 1310 may include interfaces to keyboard, mouse, voice command input, display or other input or output device. Configuration commands and/or images to be compressed may be received through input/output device interface 1310.

Network interface 1312 may include one or more interfaces to networks such as a local area network or the Internet. Network interface 1312 may include interfaces for wired or wireless connections. Configuration commands and/or images to be compressed may be received through network interface 1312.

The present invention has been described above with the aid of functional building blocks illustrating the implementation of specified functions, and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for compressing an input image, comprising:
    (a) determining a plurality of entropy code sets based upon statistically similar regions in the input image;
    (b) generating a sub-resolution image, wherein each pixel in the sub-resolution image stores an entropy code set from the plurality of entropy code sets, the entropy code set encoding corresponding pixels in the input image;

(c) encoding the input image using the generated sub-resolution image to control a compression parameter including an entropy code; and (d) outputting the encoded input image and the generated sub-resolution image as a compressed entropy coded image file.

2. A method for compressing an input image, comprising:

(a) generating, from the input image, respective sub-resolution images for each of a plurality of compression parameters, wherein each pixel in each of the respective sub-resolution images encodes a compression parameter from the plurality of compression parameters, the compression parameter encoding a set of pixels in the input image;

(b) encoding the input image using the respective sub-resolution images to control each of the plurality of compression parameters; and (c) outputting the encoded input image and the generated sub-resolution images as a compressed entropy coded image file.

3. The method of claim 2, wherein the generating respective sub-resolution images comprises:

(a) determining a plurality of entropy code sets based upon statistically similar regions in the input image; and (b) generating a first sub-resolution image, wherein each pixel in the first sub-resolution image stores an entropy code set from the plurality of entropy code sets, the entropy code set encoding corresponding pixels in the input image.

4. The method of claim 3, wherein determining the plurality of entropy code sets comprises:

(a) dividing the input image into a plurality of blocks;

(b) determining entropy statistics for respective blocks from the plurality of blocks;

(c) clustering the plurality of blocks according to similarities of the determined entropy statistics to form a plurality of block clusters; and (d) determining an entropy code for each of the block clusters.

5. The method of claim 4, wherein the number of Hock clusters formed is determined based upon minimizing a size in bits of the first sub-resolution image.

6. The method of claim 2, wherein the generating respective sub-resolution images comprises:

(a) determining, for respective blocks of the input image, a spatial predictor configured to reduce entropy of prediction; and (b) generating a second sub-resolution image comprising the spatial predictor for the respective blocks.

7. The method of claim 6, wherein encoding the input image comprises:

(a) determining the spatial predictor for respective blocks of the input image from the second sub-resolution image.

8. The method of claim 6, wherein determining the spatial predictors is further based upon minimizing an encoding costs for the block, the prediction error for the plurality of blocks, and a bias toward spatial predictors selected for neighboring pixels.

9. The method of claim 2, wherein the generating respective sub-resolution images comprises:

(a) determining, for respective blocks of the input image, color correlation factors corresponding to correlations between two or more color components in pixels of the block; and (b) generating a third sub-resolution image comprising the color correlation factors for the respective blocks.

10. The method of claim 9, wherein determining the color correlation factors for the block is further based upon:

(a) correlations between any two of green component, a red component, and a blue component; and (b) reducing entropy in red and blue channels in the block.

11. The method of claim 9, wherein encoding the input image comprises:

(a) determining a prediction error at least partially using the color correlation factors accessed from the third sub-resolution image.

12. The method of claim 2, wherein the encoding the input image comprises:

(a) encoding red, blue, green, and alpha channels using separate entropy codes.

13. The method of claim 2, wherein the encoding the input image comprises:

(a) determining a color palette locally for respective groups of one or more blocks of the input image.

14. The method of claim 13, wherein the color palette is dynamically determined using a hashing technique.

15. The method of claim 2, wherein outputting the encoded input image and the generated sub-resolution images as a compressed entropy coded image file comprises storing the encoded input image and the generated sub-resolution images using a first encoding technique.

16. The method of claim 2, wherein the encoding comprises:

(a) for respective pixels in the input image, based upon respective costs, selecting an operation from one of inserting a backward reference to an earlier occurring pixel, inserting the pixel, or inserting an index from a color palette entry, to generate an intermediate image; and (b) determining a minimum cost path of operations from the first pixel of the intermediate image to the last pixel.

17. The method of claim 16, wherein the backward reference is specified in pixels.

18. The method of claim 16, wherein the backward reference is specified using predetermined distance codes for distance in a two-dimensional plane.

19. The method of claim 16, wherein each of the respective costs includes a number of output bits for the corresponding operation.

20. The method of claim 2, further comprising:

(a) adjusting alpha values of pixels having translucent red, green, and blue values in the input image with an offset.

21. The method of claim 20, wherein the adjusting alpha values comprises:

(a) packing the dynamic range of colors in the input image in order to reduce new symbols in resulting prediction errors.

22. An encoder, comprising:

(a) a processor;

(b) a memory coupled to the processor;

(c) an entropy code generation module configured to, when executed by the processor, cause the processor to:

determine a plurality of entropy code sets based upon statistically similar regions in an input image; and generate a sub-resolution image, wherein each pixel in the sub-resolution image stores an entropy code set from the plurality of entropy code sets, the entropy code set encoding corresponding pixels in the input image;

(d) an image storing module configured to, when executed by the processor, cause the processor to:

encode the input image using the generated sub-resolution image to control a compression parameter; and (e) a compressed image file output module configured to, when executed by the processor, cause the processor to: output the encoded input image and the generated sub-resolution image as a compressed entropy coded image file.

23. The encoder of claim 22, wherein the entropy code generation module is further configured to, when executed by the processor, cause the processor to:
(a) divide the input image into a plurality of blocks;
(b) deter nine entropy statistics for respective blocks from the plurality of blocks;
(c) cluster the plurality of blocks according to similarities of the determined entropy statistics to form a plurality of block clusters; and
(d) determine an entropy code for each of the block clusters.

24. The encoder of claim 22, wherein the compressed image file output module is further configured to, when executed by the processor, cause the processor to store the encoded input image and an encoded version of the generated sub-resolution image using a first encoding technique.

25. An article of manufacture comprising a computer readable storage medium having instructions encoded thereon that, when executed by a computing device, cause the computing device to perform operations comprising:
(a) determining a plurality of entropy code sets based upon statistically similar regions in the input image;
(b) generating a sub-resolution image, wherein each pixel in the sub-resolution image stores an entropy code set from the plurality of entropy code sets, the entropy code set encoding corresponding pixels in the input image;
(c) encoding the input image using the generated sub-resolution image to control a compression parameter including an entropy code; and
(d) outputting the encoded input image and the generated sub-resolution image as a compressed entropy coded image file.

26. A method for decompressing an encoded input image, comprising:
(a) decomposing a compressed entropy coded image file to access the encoded input image and respective sub-resolution images for each of a plurality of compression parameters, wherein each pixel in each of the respective sub-resolution images encodes a compression parameter from the plurality of compression parameters, the compression parameter encoding a set of pixels in an original image;
(b) decoding the encoded input image using the respective sub-resolution images to control each of the plurality of compression parameters; and
(c) outputting the decoded input image.

27. A decoder, comprising:
(a) a processor;
(b) a memory coupled to the processor;
(c) an image file decomposer configured to, when executed by the processor, cause the processor to:
decompose a compressed entropy coded image file to access an encoded compressed input image and respective sub-resolution images for each of a plurality of compression parameters, wherein each pixel in each of the respective sub-resolution images encodes a compression parameter from the plurality of compression parameters, the compression parameter encoding a set of pixels in an original image; and
(d) an input image decoder configured to, when executed by the processor, cause the processor to:
decode the encoded input image using the respective sub-resolution images to control each of the plurality of compression parameters.

28. A method for compressing an input image, comprising:
(a) determining, for a plurality blocks of the input image, respective spatial predictors configured to reduce entropy of prediction, the determining including minimizing encoding costs for the blocks, prediction errors for the blocks, and biases toward spatial predictors selected for neighboring pixels;
(b) generating sub-resolution images comprising the spatial predictors for the respective blocks;
(c) encoding the input image using the sub-resolution images to control each of the plurality of compression parameters; and
(d) outputting the encoded input image and the generated sub-resolution images as a compressed entropy coded image file.

* * * * *

UNITED STATES PATENT AND TRADEMARK OFFICE
CERTIFICATE OF CORRECTION

PATENT NO.      : 8,615,138 B2
APPLICATION NO. : 13/288445
DATED           : December 24, 2013
INVENTOR(S)     : Jyrki Antero Alakuijala Page 1 of 1

It is certified that error appears in the above-identified patent and that said Letters Patent is hereby corrected as shown below:

In the Claims

Claim 5, Column 19, line 40, after "number of", delete "Hock" and insert the word --block--

Claim 23, Column 21, line 10, after "(b)", delete "deter nine" and insert the word --determine--

Signed and Sealed this
Eighteenth Day of November, 2014

Michelle K. Lee
*Deputy Director of the United States Patent and Trademark Office*